United States Patent [19]
Markley

[11] 3,810,104
[45] May 7, 1974

[54] PROGRAMMABLE MAGNETICS FOR A NUMERICAL CONTROL SYSTEM

[75] Inventor: Theodore J. Markley, Mentor, Ohio
[73] Assignee: Allen-Bradley Company, Milwaukee, Wis.
[22] Filed: July 31, 1972
[21] Appl. No.: 276,283

[52] U.S. Cl. .............................................. 340/172.5
[51] Int. Cl.......................... G06f 13/00, G06f 15/46
[58] Field of Search................ 340/172.5; 235/151.1

[56] References Cited
UNITED STATES PATENTS

| | | | |
|---|---|---|---|
| 3,719,931 | 3/1973 | Schroeder....................... | 340/172.5 |
| 3,753,243 | 8/1973 | Ricketts, Jr. et al............ | 340/172.5 |
| 3,686,639 | 8/1972 | Fletcher et al.................. | 340/172.5 |
| 3,701,113 | 10/1972 | Chace et al...................... | 340/172.5 |
| 3,536,902 | 10/1970 | Cochran et al................. | 340/172.5 X |
| 3,566,362 | 2/1971 | Taylor.............................. | 340/172.5 |
| 3,566,364 | 2/1971 | Hauck.............................. | 340/172.5 |
| 3,573,445 | 4/1971 | Korytnaja et al. ............ | 340/172.5 X |

FOREIGN PATENTS OR APPLICATIONS 1,126,891 9/1968 Great Britain

OTHER PUBLICATIONS
"PDP-14 and PDP-14/L Programmable Controller" in 1971 Digital Control Handbook, September 1970, pp. 361–379.

Lapidus, G. "Programmable Logic Controllers – Painless Programming to Replace the Relay Bank," in Control Engineering, April, 1971; pp. 49–60.

*Primary Examiner*—Paul J. Henon
*Assistant Examiner*—Melvin B. Chapnick
*Attorney, Agent, or Firm*—Barry E. Sammons

[57] ABSTRACT

A programmable controller connects to a numerical control system to operate the magnetics on a machine tool. An interface circuit which includes a programmable decoder connects to receive auxiliary command words generated by the numerical control and selectively set addressable storage elements. The programmable controller operates under the direction of a control program, to read the condition of the addressable storage elements, to read the condition of devices on the machine tool, and in response to these conditions operate output devices on the machine tool. A first embodiment of the invention includes a separate read only memory which performs the decoding function and a second embodiment uses a portion of the controller memory to perform this function.

10 Claims, 9 Drawing Figures

PROGRAMMABLE MAGNETICS FOR A NUMERICAL CONTROL SYSTEM

BACKGROUND OF THE INVENTION

The field of the invention is numerical control systems for machine tools and more specifically to that portion of the circuitry which controls auxiliary machine functions.

The typical "hardwired" numerical control system is designed to operate with a large variety of machine tools, and when applied to a particular machine a considerable amount of engineering must be performed to properly interface the control with the machine. In addition to reading, decoding and processing motion command words, numerical control systems read and decode auxiliary command words which control such auxiliary functions as tool changing and selection, palate changing and selection and coolant control. Due to the many diverse types of machines, however, the logic circuitry and relay circuits necessary to process the auxiliary command words cannot be standardized, but instead, must be developed for each particular machine. Such circuitry, often referred to in the art as the "magnetics", includes limit switches, speed governors, photoelectric cells, and other sensing devices connected to the machine tool. The number and nature of these devices vary considerably between machines and this lack of uniformity has been magnified in recent years by the increased demand for specially modified machines.

The task of interfacing the numerical control system with the machine tool is often a tedious and expensive process. With few exceptions, machine tool builders relay upon the numerical control systems manufacturer to design the logic circuits which control the magnetics. The interfacing process and the necessary debugging of each system, therefore, requires personnel from two or more companies. A system has long been sought in which the numerical control manufacturer provides hardware for interfacing the control system with a machine tool and the machine tool manufacturer is free to adapt the system to meet the specific requirements of each type and model of machine tool.

SUMMARY OF THE INVENTION

The present invention relates to a means of interfacing a programmable controller with a numerical control system to replace the logic circuitry and relay banks heretofore used to control machine auxiliary functions. More specifically, the invention includes an interface circuit connected to a numerical control system to receive and decode auxiliary command words generated by the numerical control system and to selectively generate in response thereto STATE logic signals, an addressable storage band containing a plurality of storage elements connected to receive and store STATE logic signals generated by the interface circuit and a programmable controller connected to selectively address the storage elements in the addressable storage bank and read the condition of any such storage element. The input and output circuits of the programmable controller are connected to sense the condition of various devices on the machine tool. In response to the condition of these devices and the condition of the addressed storage elements in the addressable storage bank, selected output devices on the machine tool are controlled in accordance with a program stored in the memory of the controller.

A general object of the invention is to interface a programmable controller such as that disclosed in the co-pending patent application Ser. No. 137,923, filed Apr. 27, 1971 and entitled "Programmable Matrix Controller," with a digital control system. The controller operates in a conventional manner to sense the condition of various input devices on the machine, and in response to these conditions and a program stored in its memory, sequentially control output devices on the machine. By means of an interface circuit, however, the controller is also responsive to commands generated by the digital control system. Each command is decoded and stored in an addressable storage element and the controller is programmed to read the condition of these storage elements and act in accordance with the results. Each addressable storage element, therefore, is treated as another input device to the programmable controller.

Another general object of the invention is to simplify the task of interfacing a numerical control system with a machine tool. The programmable controller interface circuit and addressable storage bank are sold as a package with the numerical control system. The machine tool manufacturer connects the various input and output devices associated with the machine tool to an input or output circuit on the programmable controller. The controller memory is then programmed to perform the particular functions required by the machine tool.

Another general object of the invention is to minimize the amount of hardware necessary to interface a programmable controller with a numerical control system. In a general purpose numerical control system which is adapted for use with numerous types and sizes of machine tools, provision must be made to read and process a large number of different auxiliary command words. Generally, when applied to any particular machine tool, however, no more than one third of these auxiliary commands are actually used. Therefore, to eliminate the requirement of a large number of storage elements, many of which would remain unused, the interface circuit includes a programmable decoder. The programmable decoder is programmed by the machine tool manufacturer to decode those auxiliary commands which are to be used and to assign the resulting STATE logic signals to the available storage elements. There need not, therefore, be a one-to-one correspondence between auxiliary command words and storage elements.

A more specific object of the invention is to provide a programmable decoder which uses the instruction set and programming rules used by the programmable controller. A portion of the controller memory is reserved to decode the auxiliary commands received by the interface circuit. Each received auxiliary command word is retained in a buffer storage and a decoding program in the controller memory interrogates each bit therein to establish the identity of the auxiliary command. Once this identity is established, the appropriate STATE signal is generated to a storage element in the addressable storage bank.

Still another object of the invention is to provide a means for controlling machine magnetics which may be easily altered in response to changes in equipment, which is reliable and which requires minimal floor space.

The foregoing and other objects and advantages of the invention will appear from the following description. In the description reference is made to the accompanying drawings which form a part hereof and in which there is shown by way of illustration two embodiments of the invention. Such embodiments do not necessarily represent the full scope of the invention, but rather the invention may be employed in many different embodiments, and reference is made to the claims herein for interpreting the breadth of the invention.

DESCRIPTION OF THE PREFERRED EMBODIMENTS

There are a number of commercially available programmable controllers which operate to sequentially read the condition of one or more input devices connected to the controller and in accordance with a set of instructions stored in a memory, sequentially operate one or more output devices connected to the controller. Commercially available programmable controllers vary considerably in their complexity, both in terms of hardware and software. They also vary considerably in the number of input and output devices which they can read and control. Despite these differences, they perform the same general functions, and although the embodiments of the invention disclosed herein are applied to one particular controller, those skilled in the art will readily recognize that the present invention applies wih equal result to other commercially available controllers.

Figure 1:
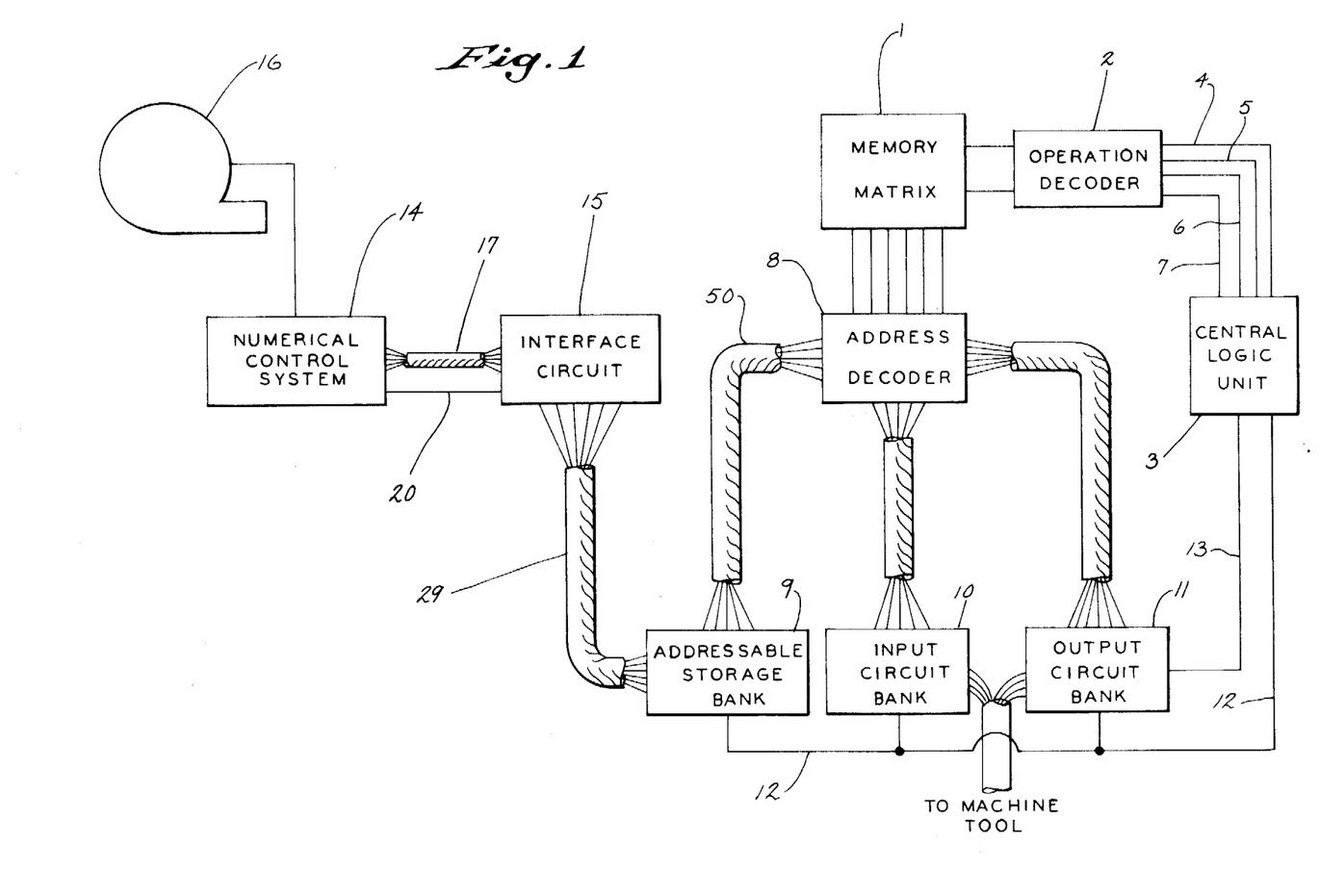
FIG. 1 is a schematic block diagram of a first embodiment of the invented system.

The programmable controller to which the preferred embodiments of the present invention are applied is described in the above cited copending patent application entitled "Programmable Matrix Controller." Referring to FIG. 1, the controller includes a memory matrix 1 which is comprised of a plurality of read only memory (ROM) units, each having a capacity of 64 eight-bit words. The memory matrix 1 also includes a counter (not shown in the drawings) which operates to read out, in sequence, each eight-bit word stored therein at a rate of 1 million per second.

Each eight-bit word read from the memory matrix 1 contains a two-bit operation code and a six-bit address code. The operation code is applied to an operation decoder 2 and is decoded into one of four operation signals which are conveyed to a central logic unit 3 by an XIO bus 4, an XIC bus 5, a BRT bus 6, or a SET bus 7. The six-bit address code is applied in parallel to the inputs of an address decoder 8. The address decoder 8 is a commercially available circuit which receives the binary coded six-bit address code and in response thereto generates activate signals at one of 64 distinct pairs of leads connected to its output. The 64 pairs, or addresses, are assigned as follows: 10 to an addressable storage bank 9, 34 to an input circuit bank 10, and 20 to an output circuit bank 11. A logic input bus 12 connects the addressable storage bank 9, the input circuit bank 10 and the output circuit bank 11 to the central logic unit 3, and a logic output bus 13 connects the output circuit bank 11 to the central logic unit 3.

In response to each eight-bit word read from the memory matrix 1, the programmable controller operates to read the condition (on or off, opened or closed) of an input device connected to an address input circuit in the bank 10, and operate (energize or deenergize) an output device connected to an addressed output circuit in the bank 11. By properly programming the controller, therefore, the status of various input devices on the machine tool are monitored and the output devices on the machine tool are operated as conditions permit. As will be discussed more fully below, the circuits which comprise the addressable storage bank 9 are treated as input devices by the controller, and it is by this means that auxiliary commands are injected into the system.

The programmable controller and addressable storage bank 9 are connected to a numerical control system 14 by means of an interface circuit 15. The numerical control system 14 may be any one of a number of commercially available systems which read and decode blocks of command data stored on a media such as magnetic or punched paper tape. An Allen-Bradley Model 4000 numerical control system is used in the preferred embodiments and is connected to a magnetic tape reader 16. The auxiliary command words received from the tape reader 16 are eight bits in length and in binary coded decimal (BCD) format. They are generated in parallel form through a cable 17 to the interface circuit 15.

Figure 2:
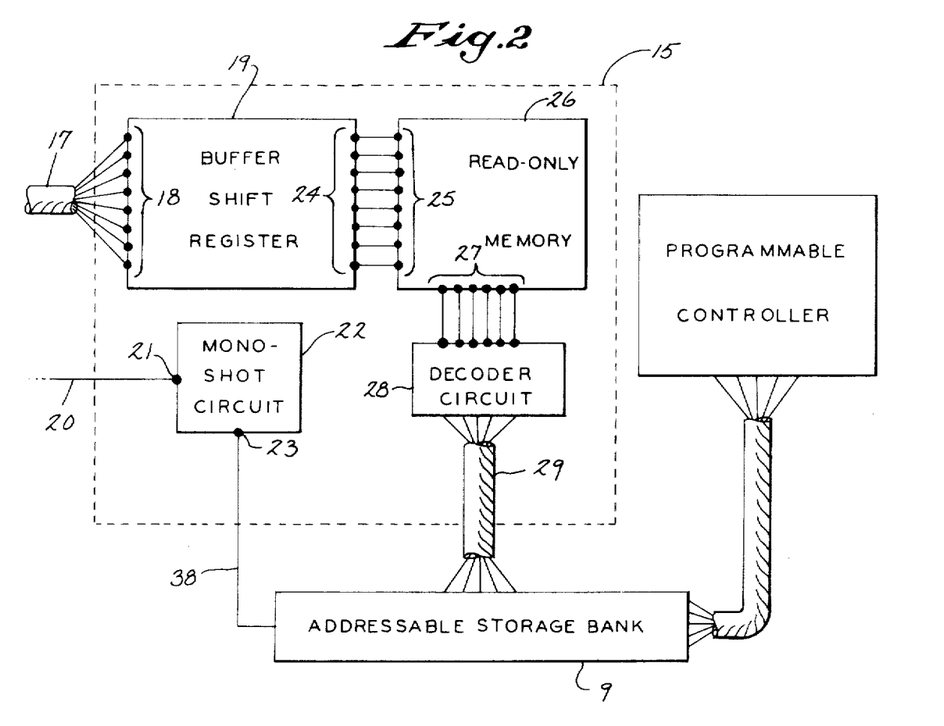
FIG. 2 is a schematic block diagram of the interface circuit which forms a part of the system of FIG. 1.

Referring to FIG. 2, each received auxiliary command word is applied to the input terminals 18 of an eight-bit buffer shift register 19. Simultaneously, a flag signal is generated by the numerical control system 14 through a lead 20 and applied to an input terminal 21 of a monoshot circuit 22. The monoshot circuit 22 is a commercially available integrated circuit which generates a voltage pulse at a Q output terminal 23 when the flag signal is received at its input terminal 21. The flag signal is a logic high voltage which is synchronized with the generated auxiliary command word. The auxiliary command word is stored in the buffer shift register 19 and is generated at a set of eight register output terminals 24.

The auxiliary command word stored in the buffer shift register 19 is applied in parallel to the address terminals 25 of a read-only memory matrix 26. The read-only memory 26 is a commercially available circuit having the capacity to store 100 six-bit words. The binary coded decimal auxiliary command words applied to its address terminals 25 are decoded internally and operate to selectively read out a six-bit binary coded word at a set of six output terminals 27. The terminals 27 connect to inputs on a decoder circuit 28. The decoder circuit 28 is a commercially available integrated circuit which converts the six-bit coded input word to a two-digit octal number. The decoder circuit 28 includes two sets of eight output terminals (a most significant digit set and a least significant digit set) which are paired to form 64 (77$_8$) separate addresses. The first 20 addresses are defined by pairing each of three most significant digit output terminals (0X, 1X and 2X) with each of the eight least significant digit output terminals (X0, X1, X2, X3, X4, X5, X6 and X7). The resulting 20 paired leads, or addresses, are connected through a cable 29 to the addressable storage bank 9.

The read-only memory 26 and decoder circuit 28 operate in combination as a programmable decoder. Each eight-bit binary coded decimal auxiliary command word that is applied to the read-only memory address terminals 25 causes one line in the memory 26 to be read out and appear at the output terminals 27. The six-bit word stored on each line represents one of the addresses 0-20, and the decoder circuit 28 operates to activate that address by generating a logic high or STATE signal on the corresponding pair of leads in the cable 29. For example, if the auxiliary command word has a decimal value of 76, the 76th line in the read-only memory 26 is read out in parallel at the memory output terminals 27. Each auxiliary command word is, therefore, converted to a six-bit address word by the read-only memory 26. The octal address 03 may, for example, be encoded on the 76th line of the memory 26, and when read out to the decoder circuit 28, results in the generation of a STATE logic signal to the circuit connected to address 03. Thus, although the numerical control system 14 may be capable of generating 100 distinct auxiliary command words, the particular command words used are decoded to generate a STATE signal to one of the 20 addresses allocated to the addressable storage bank 9.

Figure 3:
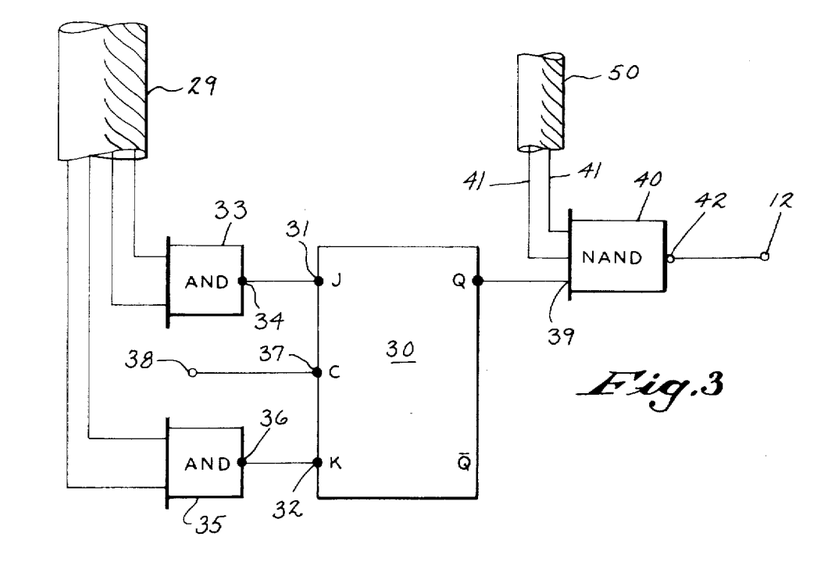
FIG. 3 is an electrical schematic diagram of an addressable storage element which forms a part of the addressable storage bank shown in FIGS. 1 and 2.

Referring to FIG. 3, the addressable storage bank 9 is comprised of 10 addressable storage elements. Each addressable storage element includes a J-K flip-flop 30 having a J input terminal 31 and a K input terminal 32. A pair of leads comprising one address in the cable 29 connect to a pair of input terminals on a first AND gate 33 and an output terminal 34 on the AND gate 33 connects to the J input terminal 31. A pair of leads comprising a second address in the cable 29 connect to a pair of inputs on a second AND gate 35, and an output terminal 36 on the second AND gate 35 connects to the K input terminal 32. A clock terminal 37 on the flip-flop 30 connects to the Q terminal 23 on the monoshot circuit 22 through a bus 38. A Q output terminal on the flip-flop 30 connects to a first input terminal 39 on an output NAND gate 40 and a pair of additional input terminals on the NAND gate 40 attach to a pair of leads 41 which comprise one address in the cable 50 connected with the address decoder 8. In this first preferred embodiment, the address of the leads 41 correspond with the address of the leads connected to the first AND gate 33. An output terminal 42 on the NAND gate 40 connects to the logic input bus 12 of the programmable controller.

Each auxiliary command word generated by the numerical control system 14 generates a STATE signal to one of the AND gates 33 or 35 of one of the addressable storage elements. The majority of auxiliary commands are paired to perform mutually exclusive functions such as energizing and deenergizing an output device on the machine tool. For example, the auxiliary command designated by the decimal number 40 indicates that coolant should be turned on and the auxiliary command word designated by the decimal number 41 indicates that it should be turned off. The six-bit words stored on lines 40 and 41 of the read-only memory 26 are decoded to address a single addressable storage element in the addressable storage bank 9. When the auxiliary command word 40 is received at the buffer shift register 19, therefore, a logic high STATE signal is applied to the J input terminal 31 of the flip-flop 30 and a voltage pulse is applied to the clock terminal 37 to set the flip-flop 30. Similarly, when the auxiliary command word 41 is received at the buffer shift register 19, it is decoded to apply a STATE signal to the second AND gate 35 to drive the K input terminal 32 to a logic high voltage. When clocked by a voltage pulse from the monoshot circuit 22, the flip-flop 30 is reset and its Q terminal is driven to a logic low voltage. By reading the condition of the Q output terminal, the programmable controller determines whether coolant is commanded on or off. This is accomplished by an instruction in the memory matrix 1 which addresses the NAND gate 40 through the leads 41, and simultaneously reads (XIC or XIO) the logic state of the logic input bus 12. The leads 41 are driven to a logic high voltage and the logic state of the Q terminal is gated through to the logic input bus 12. Subsequent instructions in the control program stored in the memory matrix 1 operate the machine tool consistent with the coolant command.

It should be apparent from the above description that the process of interfacing the machine tool with the numerical control system is entirely a matter of properly programming the controller memory 1 and the interface memory 26. Thus, with a minimal amount of hardware, the numerical control system may be interfaced to any particular machine tool merely by programming the memories 1 and 26. The machine tool builder is free to select and combine auxiliary functions and make any modifications desired by the purchaser without making hardware alterations. Auxiliary functions are thus made programmable.

In the first embodiment of the invention described above, programmable decoding of the auxiliary command words is accomplished by a separate read-only memory and decoder circuit. In the second embodiment of the invention to be described below, the necessity of this additional hardware is avoided by using the controller memory and address decoder. To perform this dual function of decoding and controlling machine functions, the controller memory is divided into two portions and a selected number of addresses are reserved for each function. To more fully understand this embodiment of the invention, reference is again made to the above cited copending application entitled "Programmable Matrix Controller" and to an additional copending patent application Ser. No. 166,796 entitled "Programmable Controller Expansion Circuit."

Figure 4:
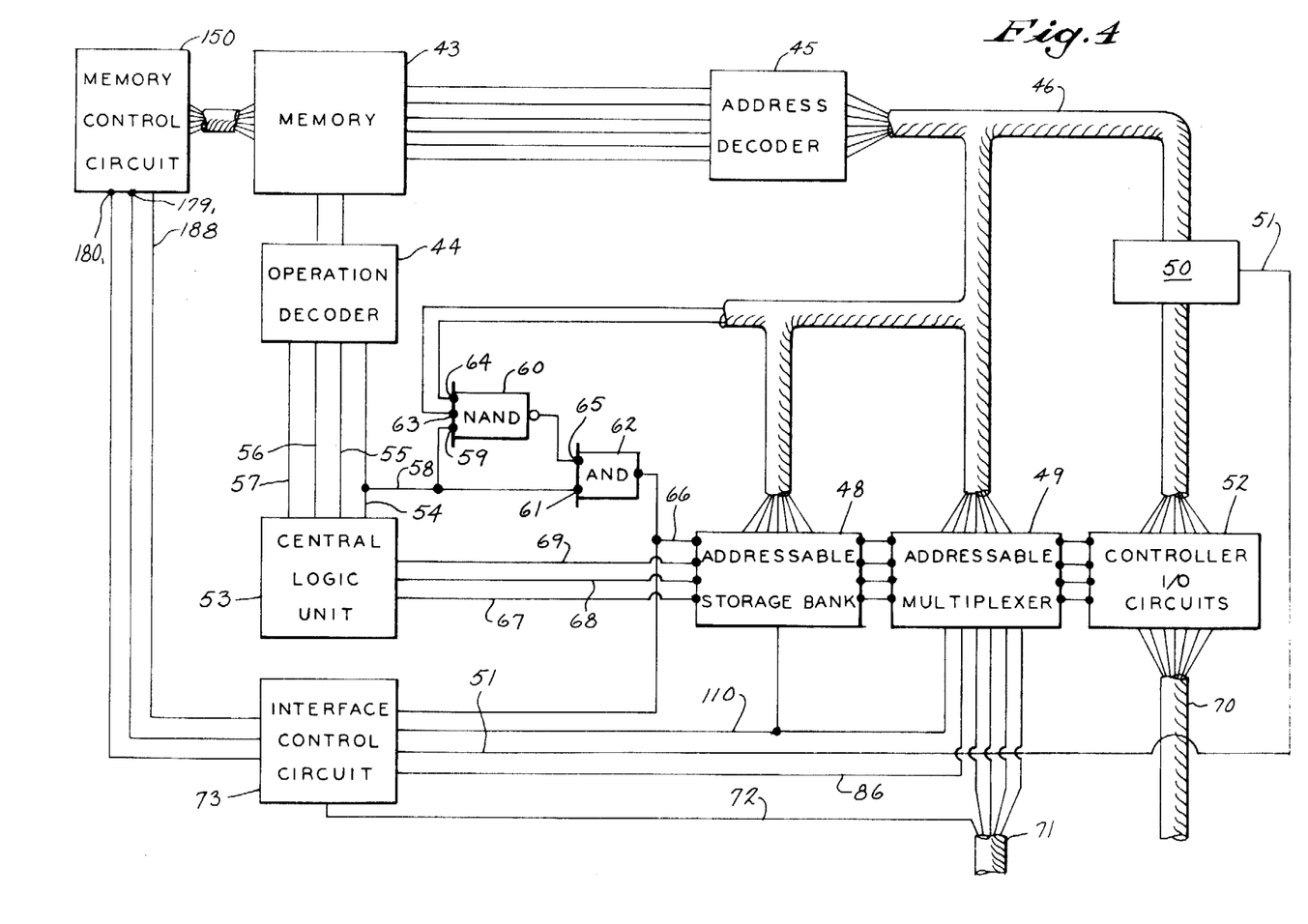
FIG. 4 is an electrical block diagram of a second embodiment of the invented system.

Referring to FIG. 4, a programmable controller such as that described in the above cited copending patent application entitled programmable matrix controller, includes a controller memory 43 which includes 20, 64 word, eight-bit read-only memory matrices which are read in sequence at a rate of 1 million words per second. A two-bit operation code in each word read from the controller memory 43 is conveyed to an operation decoder 44 and a six-bit address code in each word is conveyed to an address decoder 45. The address decoder 45 is a pair of commercially available binary-to-octal decoders which provide two sets of eight output terminals. The eight least significant digit output terminals (X0–X7) and eight most significant digit output terminals (0X–7X) of the address decoder 45 connect to corresponding leads on an address cable 46. The address cable 46 connects to an addressable storage bank 48, to an addressable multiplexer 49, and to the inputs of a gating circuit 50. The gating circuit 50 is a set of eight AND gates (not shown in the drawings), one for each of the most significant digit leads in the cable 46, and each having a second input terminal which connects with an enable line 51. The outputs of the gating circuit 50 connect to the address terminals on a controller input/output circuit bank 52.

The operation decoder 44 is connected to a central logic unit 53 through a BRT bus 54, a SET bus 55, an XIC bus 56, and an XIO bus 57. The BRT bus 54 also connects through a lead 58 to a first input terminal 59 of an expansion NAND gate 60 and to a first input terminal 61 of an expansion AND gate 62. Second and third input terminals 63 and 64 on the expansion NAND gate 60 connect to the leads 7X and X7 in the address cable 46 to receive activate signals when the octal address 77 is read from the memory 43. The output of the expansion NAND gate 60 connects to a second input terminal 65 on the expansion AND gate 62 and the ouput of the expansion AND gate 62 connects with an address expansion bus 66. The operation decoder 44 operates in response to the two-bit operation code in each word read from the memory 43 to generate a logic high operation signal on one of the buses 54–57. The central logic unit 53 operates in response to the operation signals thus generated to either read the logic condition of a logic input bus 67, store the results of a read operation, or generate a STATE signal on a logic output bus 68. Not only is a STATE signal generated on the logic output bus 68 when a SET operation code is read from memory, but a clock pulse is also generated on a clock pulse bus 69.

The elements in FIG. 4 thus far described operate in response to a controller program stored in the memory 43 as indicated in the above cited copending patent applications. Various electrical and electro-mechanical devices on the machine tool are connected to the controller input/output circuit bank 52 by a cable 70. Each of these devices is addressable by a particular six-bit address code, and depending on the two-bit operation code contained in the same instruction, the device may be either monitored by observing the logic state of the logic input bus 67, or it may be operated by generating an appropriate command signal on the logic output bus 68. The expansion circuit comprised of the expansion NAND gate 60 and the expansion AND gate 62 operates to double the number of available addresses from 64 to 128 by using a normally non-addressable operation code (BRT). In other words, when a BRT operation code is accompanied by an address code, the central logic unit 53 operates to perform a read (XIC) operation on a separate bank of 64 devices designated by the octal addresses 100–177. It is an inherent limitation of this expanded address capability, however, that only read operations can be performed on the addresses 100–177.

Auxiliary command word data from the numerical control system is applied to the controller through the addressable multiplexer 49. A cable 71 containing five leads transmits in serial form four eight-bit auxiliary command words to the addressable multiplexer 49 and a flag signal through a lead 72 to an interface control circuit 73. As will be described in more detail below, the interface control circuit 73 operates to synchronize the various operations of the interface circuit. For example, each received auxiliary command word is first identified by reading each bit therein with sets of instructions stored in the controller memory 43. Having identified the auxiliary command, a storage element in the addressable storage bank 48 is set by a STATE signal generated on the logic output bus 68. These functions involve elements of the controller and the interface control circuit 73 operates generally to divert these elements from their normal controller function when a flag is received from the numerical control system. When the received auxiliary command word is recognized and recorded, the interface control circuit 73 returns the controller elements to their normal control functions.

Figure 5:
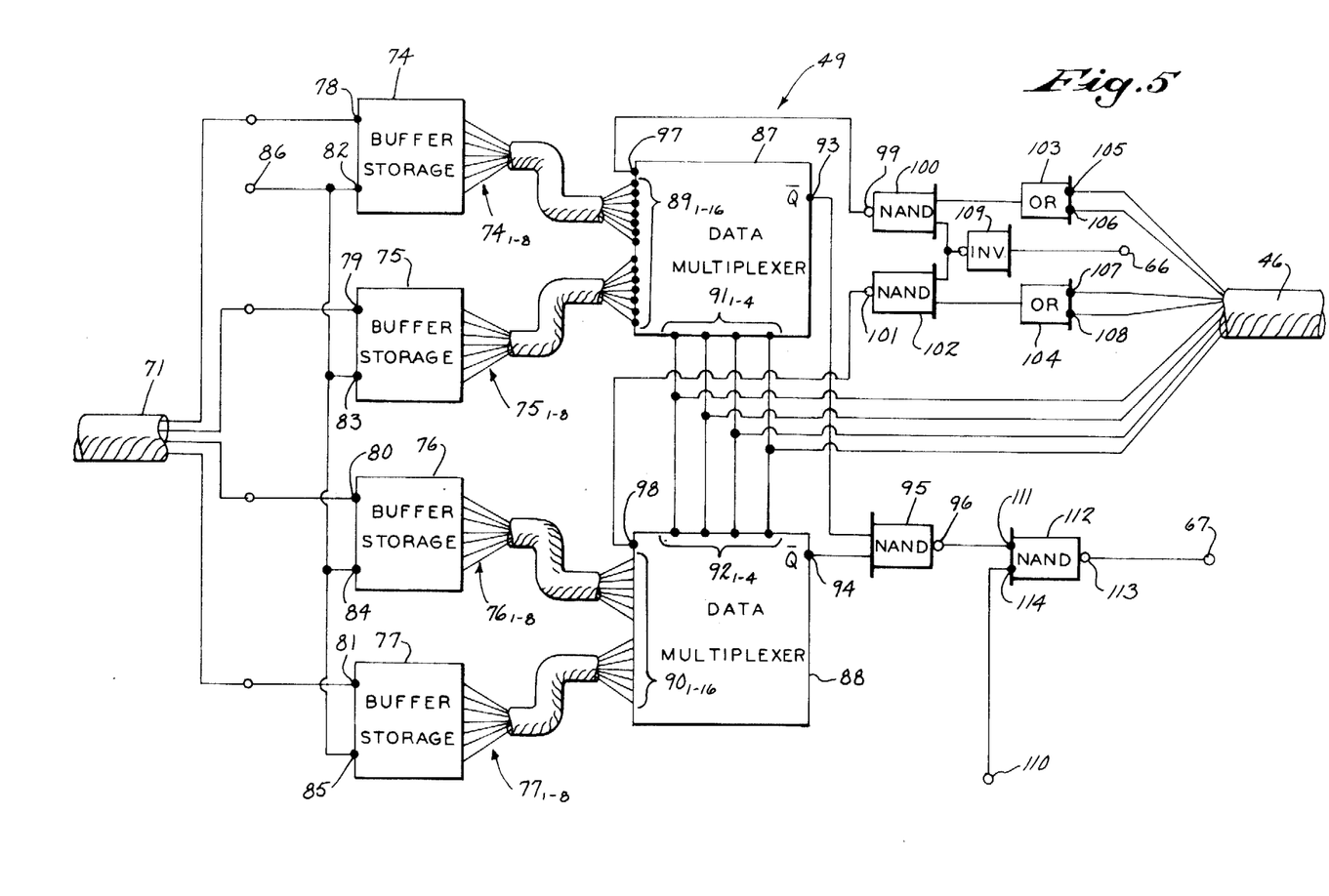
FIG. 5 is an electrical schematic diagram of the addressable multiplexer which forms a part of the system of FIG. 4.

The addressable multiplexer 49 receives and stores the auxiliary command words until they can be identified and recorded. Referring to FIG. 5, the addressable multiplexer 49 includes four eight-bit buffer shift registers 74–77. Each buffer shift register 74–77 is a commercially available shift register which receives (in serial form) an eight-bit auxiliary command word at a data input terminal 78–81. The auxiliary command words are stored until a logic low voltage is applied to respective buffer reset terminals 82–85 which connect to a buffer reset bus 86. The stored auxiliary command words are read out of each buffer shift register 74–77 (in parallel) at a set of eight output terminals $74_{1-8}$, $75_{1-8}$, $76_{1-8}$ and $77_{1-8}$.

The addressable multiplexer 49 also includes a pair of data multiplexer circuits 87 and 88. These circuits are commercially available in integrated form and are more commonly referred to as 16-bit data selectors/multiplexers. The first data multiplexer 87 connects to receive the eight-bit auxiliary command words stored in the first and second buffer shift registers 74 and 75 at a set of 16 input terminals $89_{1-16}$, and the second data multiplexer 88 connects to receive the auxiliary command words stored in the buffer shift registers 76 and 77 at a set of 16 input terminals $90_{1-16}$. The data multiplexers 87 and 88 each include four data select terminals $91_{1-4}$ and $92_{1-4}$ which are connected together and connected to four leads in the address cable 46. The data multiplexers 87 and 88 operate in response to four-bit binary address codes applied to their respective data select terminals 91 and 92 to selectively read the logic state applied to one of its 16 input terminals $89_{1-16}$ and $90_{1-16}$. Because a binary address code is required by the particular devices used herein, the data select terminals $91_{1-4}$ and $92_{1-4}$ are not connected to output terminals on the address decoder 45 but instead, are connected to receive directly the four least significant digits of the six-bit address code read from the memory 43. The four-bit address code applied to the data select terminals $91_{1-4}$ and $92_{1-4}$ are sufficient to specify and read the logic state of a single input terminal on each of the data multiplexers 87 and 88. However, to further specify which one of these two selected inputs is to be read out of the addressable multiplexer 49, use is made of a strobe terminal 97 on the first data multiplexer 87 and a strobe terminal 98 on the second data multiplexer 88. The strobe terminal 97 connects to an output terminal 99 of a first NAND gate 100 and the strobe terminal 98 connects to the output terminal 101 of a second NAND gate 102. A first input terminal on each NAND gate 100 and 102 connects to the address expansion bus 68 through an inverter circuit 109, a second input terminal on the first NAND gate 100 connects to the output of a first OR gate 103, and a second input terminal on the second NAND gate 102 connects to the output terminal of a second OR gate 104. A first input terminal 105 on the first OR gate 103 connects to the address decoder output terminal 1X, a second input terminal 106 on the first OR gate 103 connects to the address decoder output terminal 2X, a first input terminal 107 on the second OR gate 104 connects to the address decoder output terminal 3X, and a second input terminal 108 on the second OR gate 104 connects to the address decoder output terminal 4X. When an address having a most significant digit of one or two is read from the memory 43, the first data multiplexer 87 is activated, and when an address having a most significant digit of three or four is read from the memory 43, the second data multiplexer 88 is activated. Any one of the 32 bits stored in the addressable multiplexer 49 can, therefore, be specified by the address code in each instruction of a decoding program.

Selected data is read out of the data multiplexers 87 and 88 one bit per instruction at respective $\overline{Q}$ terminals 93 and 94. When the selected input terminal of the data multiplexer 87 or 88 is at a logic high voltage, a logic low voltage is generated at the respective $\overline{Q}$ output terminal 93 or 94. The $\overline{Q}$ terminals 93 and 94 both connect to the inputs of an output NAND gate 95, the output terminal 96 of which connects to a first input terminal 111 on an enable NAND gate 112. An output terminal 113 on the enable NAND gate 112 connects to the central logic unit 53 through the logic input bus 67. A second input terminal 114 on the enable NAND gate 112 connects to a decoder enable bus 110 which eminates from the interface control circuit 73. The logic signals on the $\overline{Q}$ output terminals 93 and 94 are gated through the output NAND gate 96 and applied to the enable NAND gate 112. When the decoding portion of the program stored in the memory 43 is being executed, the interface control circuit 73 generates a logic high on the decoder enable bus 110 and the output of the addressable multiplexer 49 is gated through to the central logic unit 53.

The addressable multiplexer 49 is activated when an address of from 10 to 47 (octal) is read from the memory 43. The address expansion bus 66 is at a logic low voltage during decoding, and this is inverted by the inverter 109 and applied to enable the first and second NAND gates 100 and 102. If the address code is from 10 to 27 (octal) the first OR gate 103 and first NAND gate 100 are gated and a logic low voltage is applied to the strobe terminal 97 on the first data multiplexer 87. As a result, any one of the 16 input terminals $89_{1-16}$ may be selected and read out through the $\overline{Q}$ terminal 93 to the output NAND gate 95. On the other hand, an address code of from 30 to 47 (octal) gates the second OR gate 104 and second NAND gate 102 and a logic low voltage is applied to the strobe terminal 98 on the second data multiplexer 88. The condition of each of its 16 input terminals $90_{1-16}$ can therefore be read out to the logic input bus 67.

Figure 6:
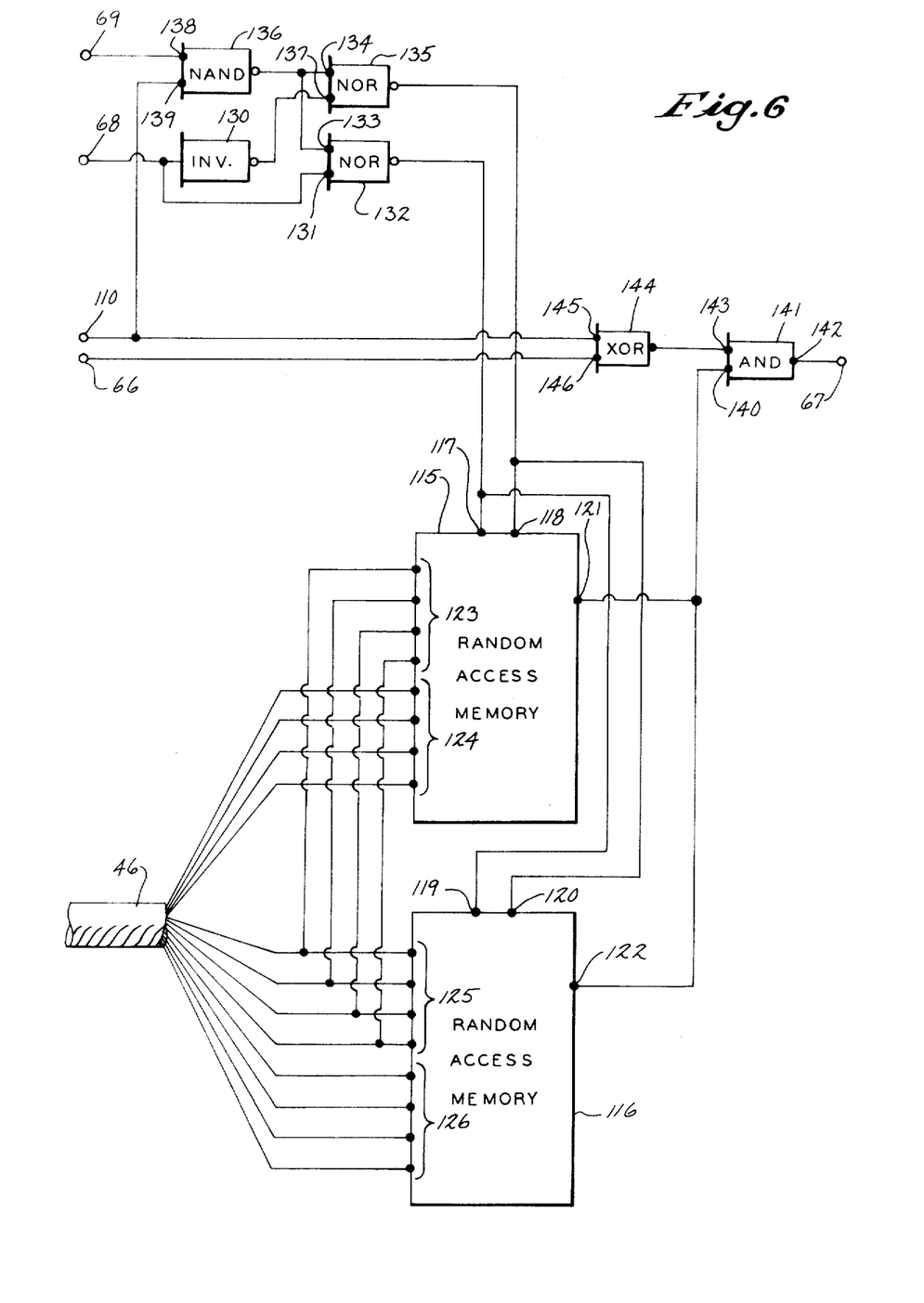
FIG. 6 is an electrical schematic diagram of the addressable storage bank which forms a part of the system of FIG. 4.

The auxiliary command words stored in the addressable multiplexer 49 are identified by reading them one bit at a time with a decoding program. Having properly identified the auxiliary command, a STATE signal is generated to a storage element in the addressable storage bank 48. Referring to FIG. 6, the addressable storage bank 48 includes a pair of 16-bit random access memory circuits 115 and 116. The memories 115 and 116 are commercially available integrated circuits which receive and store one-bit STATE signals at designated addresses and read those STATE signals out upon demand. The random access memory 115 includes a pair of data input terminals 117 and 118 which connect to corresponding data input terminals 119 and 120 on the second memory 116. The random access memory 115 includes a set of four X input terminals 123 and a set of four Y input terminals 124. Similarly, the second random access memory 116 includes a set of four X input terminals 125 and a set of four Y input terminals 126. The respective X input terminals 123 and 125 on each memory 115 and 116 are connected together and are connected to respective address decoder leads 0X, 5X, 6X and 7X in the address cable 46. The Y input terminals 124 on the first memory 115 connect to the respective address leads X0, X1, X2 and X3, and the Y input terminals 126 on the second memory 116 connect to the respective address leads X4, X5, X6 and X7. The application of a logic high voltage to one of the X input terminals and to one of the Y input terminals on the random access memories 115 and 116 addresses one of the 16 storage elements therein. More specifically, the 16 storage elements in the random access memory 115 are activated by the respective octal addresses 00–03 , 50–53, 60–63, and 70–73, and the 16 storage elements in the random access memory 116 are activated by the respective octal addresses 04–07, 54–57, 64–67, and 74–77.

When a logic high voltage is applied to the first data input terminals 117 and 119 of the random access memories 115 and 116, a zero, or logic low, is written on the addressed memory element. Conversely, when a logic high voltage is applied to the second data input terminals 118 and 120, a one, or logic high voltage is written on the addressed memory element. When no logic high voltages are applied to the data input terminals 117, 118, 119 and 120, the logic state of an addressed storage element is read out at respective memory output terminals 121 and 122.

Data, or STATE signals, are read into and stored in the random access memories 115 and 116 through the logic output bus 68. Referring to FIG. 6, the logic output bus 68 connects to the input of an inverter gate 130 and to a first input terminal 131 on a first NOR gate 132. The output of the first NOR gate 132 connects to the memory data input terminals 117 and 119 and a second input terminal 133 connects to a first input terminal 134 on a second NOR gate 135. The output of the second NOR gate 135 connects to the memory data input terminals 118 and 120. The NOR gate first input terminal 134 also connects to the output of an input NAND gate 136, and a second NOR gate input terminal 137 connects to the output of the inverter 130. A first input terminal 138 on the input NAND gate 136 connects to the clock pulse bus 69 and a second input terminal 139 connects to the decoder enable bus 110.

To write, or store a STATE signal in one of the addressable storage elements in the random access memories 115 or 116, a SET instruction is read from the memory 43. The central logic unit 53 operates in response to such an instruction to generate a STATE logic signal on the logic output bus 68 and simultaneously generate a logic high clock pulse on the clock pulse bus 69. A logic low is thus generated at the output of the input NAND gate 136 and applied to the input terminals 133 and 134 of the respective NOR gates 132 and 135. Therefore, if a logic high STATE signal is generated on the logic output bus 68, it is inverted by the gate 130 and is gated through the second NOR gate 135 to generate a logic high voltage to the data input terminals 118 and 120. A one, or logic high, is thus written into the storage element which is addressed by the same SET instruction. If, on the other hand, a logic low STATE signal is generated on the logic output bus 68, it is gated through the first NOR gate 132 and a logic high voltage is applied to the data input terminals 117 and 119. A zero, or logic low, is thereby stored in the addressed storage element.

By means of a "read" instruction, the logic state, or condition of an addressed storage element can be read out of the addressable storage bank 48 through one of the memory output terminals 121 or 122 to the central logic unit 53. The memory output terminals 121 and 122 connect to a first input terminal 140 on an output AND gate 141. An output terminal 142 on the output AND gate 141 connects to the logic input bus 67. A second input terminal 143 on the AND gate 141 connects to the output of an exclusive OR gate 144. A first input terminal 145 on the exclusive OR gate 144 connects to the decoder enable bus 110 and a second input terminal 146 connects to the address expansion bus 66. Although, as indicated above, the STATE signals are written into the storage elements of the random access memories 115 and 116 with SET instructions containing address codes ranging from zero to seven and 50 to 77 (octal), the condition of these same storage elements can only be read with instructions which activate the expanded addresses $100_8$ to $107_8$ and $150_8$ to $177_8$. This "address shift" is accomplished by the connection of the address expansion bus 66 to the exclusive OR gate 144, and it is done to preserve the more versatile addresses $0_8$–$77_8$ for controlling input and output devices on the machine tool. A logic high voltage is, therefore, generated on the address expansion bus 66 and a logic high is generated at the output of the exclusive OR gate 144 which gates the output AND gate 141. Read instructions calling on the expanded addresses $100_8$ to $107_8$ and $150_8$ to $177_8$ will, therefore, activate the addressable storage bank 48, and generate the STATE logic signals stored therein to the controller central logic unit 53.

It should be apparent from the description thus far that the controller memory 43 contains two programs; a controller program which operates the magnetics of the machine tool, and a decoding program which operates in conjunction with the interface circuit to process the auxiliary command words received from the numerical control system. Both programs operate the central logic unit 53 by means of a two-bit operation code in each instruction, and therefore, the programming language and format is identical for both.

Figure 7:
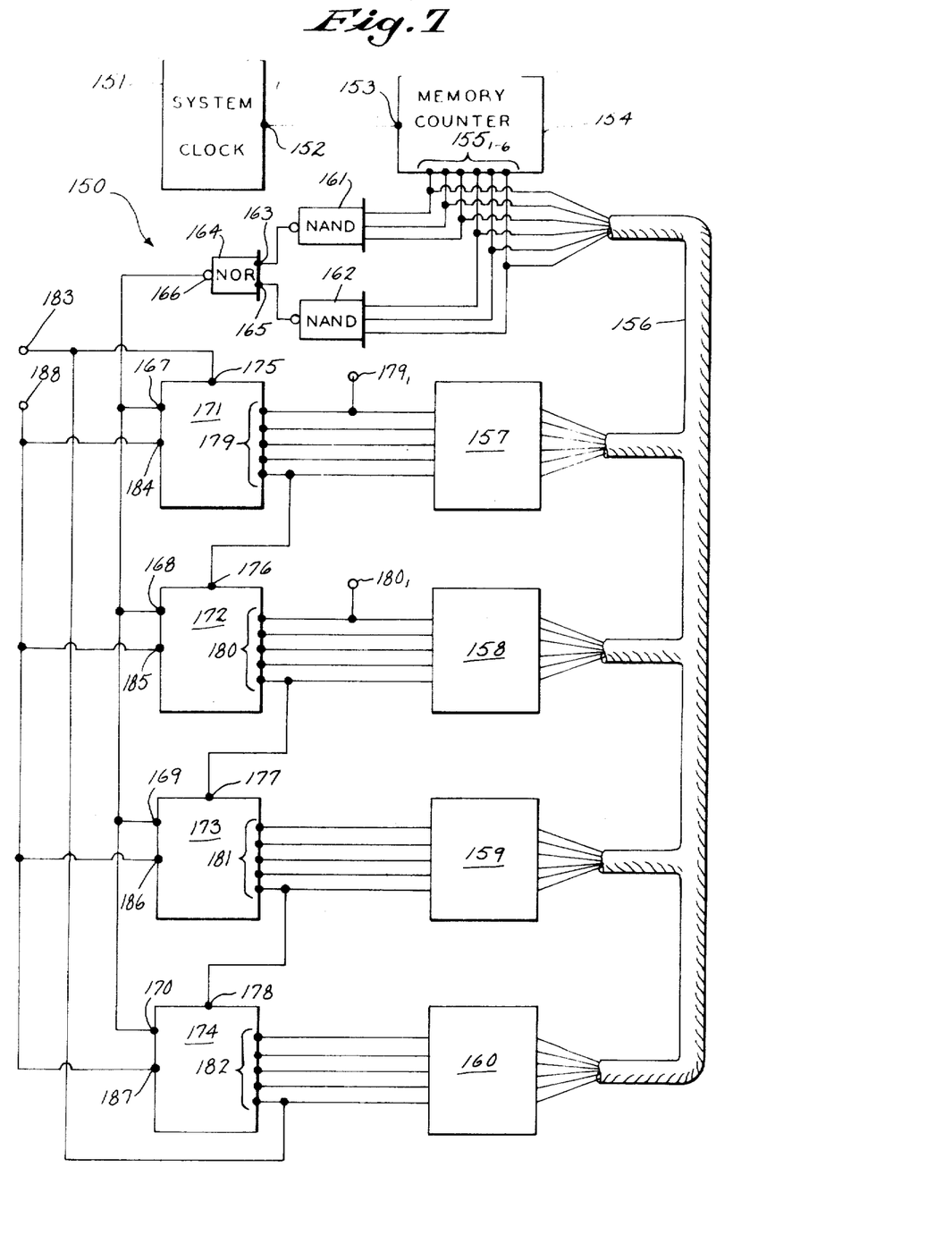
FIG. 7 is an electrical schematic diagram of the memory control circuit which forms a part of the system of FIG. 4.

Referring to FIG. 7, control over the manner in which the programs stored in the memory 43 are executed is exercised through a memory control circuit 150. The control circuit 150 includes a 1 megahertz clock pulse generator 151 which has an output terminal 152 connected to an input terminal 153 of a six-bit binary counter 154. The counter 154 is a commercially available integrated circuit which counts up to 64 clock pulses and generates a six-bit binary number representative of this count at a set of six output terminals $155_{1-6}$. The respective output terminals $155_{1-6}$ connect to corresponding leads in a memory address bus 156, and the bus 156 in turn connects to corresponding memory address terminals on each of four memory cards 157–160. Each memory card includes five 64 line read-only memories, and the six-bit binary signal generated at the counter output terminals $155_{1-6}$ operates to sequentially address the 64 lines in each of the 20 read-only memories.

Three of the counter output terminals $155_{1-3}$ connect to the inputs of a first NAND gate 161, and the remaining three output terminals $155_{4-6}$ connect to the inputs of a second NAND gate 162. The output of the first NAND gate 161 connects to a first input terminal 163 on a NOR gate 164, and the output of the second NAND gate 162 connects to a second NOR gate input terminal 165. An output terminal 166 on the NOR gate 164 connects to four clock terminals 167–170 on respective shift registers 171–174. The shift registers 171–174 are commercially available five-bit shift registers which each includes a data input terminal 175–178 and five data output terminals $179_{1-5}$, $180_{1-5}$, $181_{1-5}$ and $182_{1-5}$. The fifth data output terminal $179_5$, $180_5$, $181_5$ and $182_5$ on each shift register 171–174 connects to the respective data input terminals 176, 177, 178 and 175 of the next succeeding shift register to form a closed ring which circulates data stored in the registers. Each of the data output terminals $179_{1-5}$, $180_{1-5}$, $181_{1-5}$ and $182_{1-5}$ connects to an enable terminal on one of the read-only memories contained on the respective memory cards 157–160.

A logic high, or "one," is entered into the first shift register 171 through an initialization terminal 183, and this "one" is shifted through the registers 171–174 in response to the logic high voltage pulses applied to their clock terminals 167–170 by the NOR gate 164. Each time the memory counter 154 cycles through and reaches a count of 64, all of its output terminals $155_{1-6}$ are high and a logic high voltage pulse is gated to the shift registers 171–174. The "one" is thus circulated through the shift registers and appears at successive data output terminals $179_{1-5}$, $180_{1-5}$, $181_{1-5}$ and $182_{1-5}$ to sequentially enable each read-only memory on the cards 157–160. When thus enabled, the 64 lines in each read-only memory are addressed in sequence through the cable 156 by the memory counter 154.

Each of the shift registers 171–174 includes a reset terminal 184–187 which connects with a memory reset bus 188. When a logic high reset voltage is applied to the memory reset bus 188, the shift registers 171–174 are cleared and the circulating "one" is set to zero. When thus reset, however, a logic high, or "one" is immediately reintroduced through the initialization terminal 183 and appears at the data output terminal $179_1$ to enable the first read-only memory on the card 157. Thus, regardless of which of the 20 read-only memories are enabled, when a logic high is applied to the memory reset bus 188, the memory is reset to read the first instruction in the first read-only memory. Since the decoding program is contained on the first five read-only memories, when the memory is reset, the decoding program is immediately executed.

Figure 8:
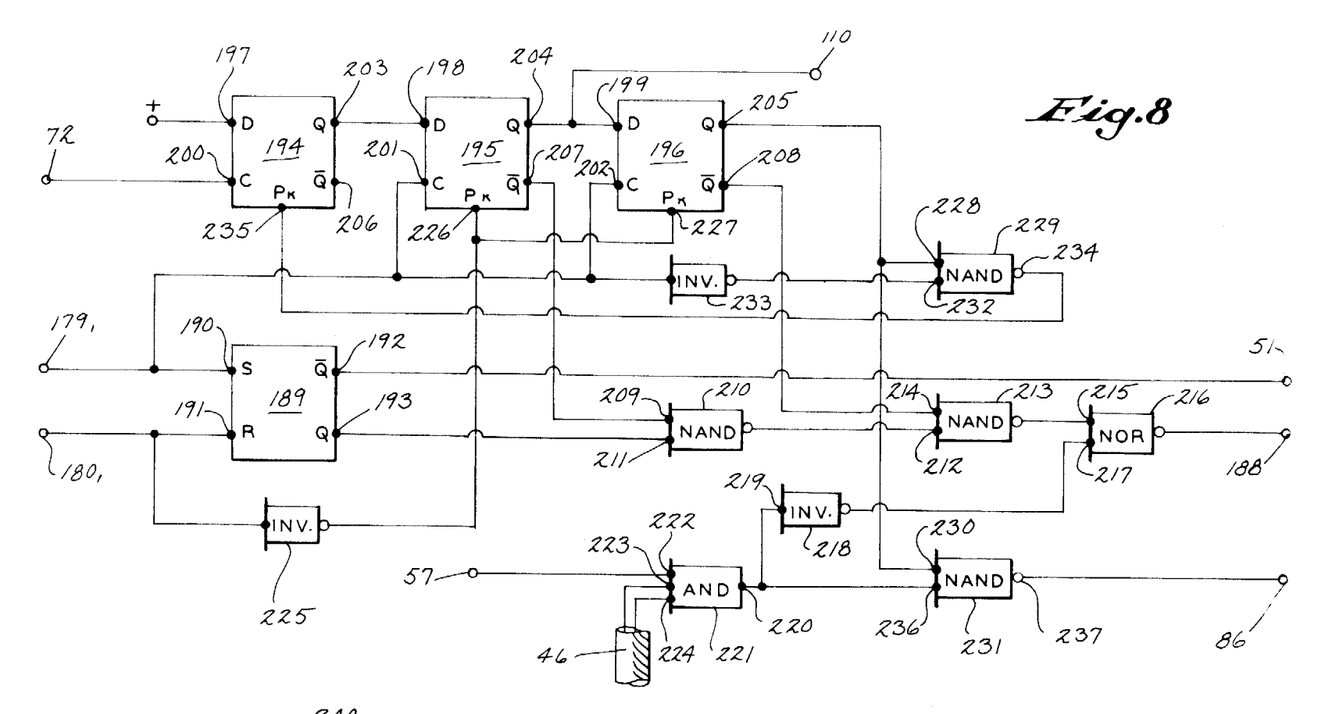
FIG. 8 is an electrical schematic diagram of the interface control circuit which forms a part of the system of FIG. 4.

Referring to FIGS. 1 and 8, the operation of the various elements of the interface circuit is coordinated by the interface control circuit 73. The interface control circuit 73 includes an interface flip-flop 189 which has an S input terminal 190 connected to shift register output terminal $179_1$ in the memory control circuit 150, and an R input terminal 191 connected to the shift register output terminal $180_1$. The interface flip-flop 189 is a commercially available integrated circuit commonly referred to as an R–S flip-flop. When the decoding program is initiated and the first read-only memory is enabled, a logic high voltage is applied to the S input terminal 190 and the interface flip-flop 189 is set. A Q output terminal 192 on the flip-flop 189 is thus driven to a logic low voltage and this logic low voltage is applied to the enable bus 51 to "disconnect" the input-output circuit bank 52 from the address decoder 45. The interface flip-flop 189 remains set until the decoding program is completed, at which time the sixth read-only memory is enabled and a logic high voltage is applied to the R input terminal 191. The interface flip-flop 189 is thus reset, and its Q output terminal 192 is driven to a logic high voltage.

The interface control circuit 73 also includes three control flip-flops 194, 195 and 196. The control flip-flops 194–196 are commercially available D-type flip-flops each of which includes a D input terminal 197–199 and a clock, or C input terminal 200–202. Each control flip-flop 194–196 operates in response to a positive voltage transition at its C input terminal 200–202 to transfer the logic state at its D input terminal 197–199 to a respective Q output terminal 203–205. Simultaneously, the inversion of the logic signal applied to their D input terminals is generated at respective $\bar{Q}$ output terminals 206–208. The D input terminal 197 on the first control flip-flop 194 connects to a source of logic high voltage and its C input terminal 200 connects to receive the flag signal generated on the lead 72 by the numerical control system. The flag signal is a positive voltage pulse and the first control flip-flop 194 operates in response to generate a logic high voltage at its Q output terminal 203. The flag signal may be generated at any point in the controller program, and the first control flip-flop 194 serves to store this information until the decoding program has been completed.

The Q output terminal 203 on the first control flip-flop 194 connects to the D input terminal 198 on the second control flip-flop 195 and the C input terminal 201 on the second control flip-flop 195 connects to the shift register output terminal $179_1$ in the memory control circuit 150 to receive a positive voltage step when the decoding program is initiated. The second control flip-flop Q output terminal 204 connects to both the D input terminal 199 on the third control flip-flop 196 and to the decoder enable bus 110. If a flag is received from the numerical control system during the controller program, the D input terminal 198 is at a logic high voltage when the decoding program is initiated. As a result, the second control flip-flop 195 is set and a logic high enable signal is generated to the addressable storage bank 48 and addressable multiplexer 49 through the decoder enable bus 110. The fact that an active transfer of an auxiliary command word has occurred is thus recognized by the interface control circuit 73 and the elements of the interface circit are enabled and ready to execute the decoding program.

The $\bar{Q}$ output terminal 207 on the second control flip-flop 195 connects to a first input terminal 209 on a first recycle NAND gate 210. A second input terminal 211 on the NAND gate 210 connects to a Q output terminal 193 on the interface flip-flop 189, and its output terminal connects to a first input terminal 212 on a second recycle NAND gate 213. A second input terminal 214 on the second recycle NAND gate 213 connects to the $\bar{Q}$ output terminal 208 on the third control flip-flop 196, and its output terminal connects to a first input terminal 215 on a recycle NOR gate 216. The output of the recycle NOR gate 216 connects to the memory reset bus 188 and a second input terminal 217 on the recycle NOR gate 216 connects to the output of a first inverter 218. An input terminal 219 on the first inverter 218 connects to the output terminal 220 of a reset AND gate 221. A first input terminal 222 on the reset AND gate 221 connects to the XIO bus 57, a second input terminal 223 connects to the address decoder output terminal 7X, and a third input terminal 224 connects to the address decoder output terminal X7.

The recycle gates 210, 213 and 216 operate to reset the memory after the decoding program has been fully executed once. There are a number of mutually exclusive auxiliary commands, and a second pass, or cycle, through the decoder program is required to decode and store the second of a mutually exclusive pair of auxiliary commands. During the first pass through the decoding program, the $\bar{Q}$ output terminal 207 on the second control flip-flop 195 is at a logic low voltage and a logic high voltage is therefore generated by first recycle NAND gate 210 and applied to the first input terminal 212 on the second recycle NAND gate 213. Also during the first pass, the third control flip-flop 196 remains in its reset state and its $\bar{Q}$ output terminal 208 is at a logic high voltage. The second recycle NAND gate 213, therefore, generates a logic low voltage to the first input terminal 215 on the recycle NOR gate 216.

The last instruction of the decoding program is a memory reset instruction (XIO 77). At the end of the first cycle through the decoding program, therefore, the XIO bus 57 and the address decoder output terminals 7X and X7 are driven to a logic high voltage. A logic high voltage is thus generated by reset AND gate 221, inverted by the gate 218, and applied to the second input terminal 217 of the recycle NOR gate 216. Both inputs to the recycle NOR gate 216 are thus low, and as a result, a logic high reset pulse is generated to reset the memory 43 for a second cycle through the decoding program.

At the beginning of the second cycle, a positive voltage step is generated at the shift register output terminal $179_1$. This is applied to the C terminal 202 of the third control flip-flop 196 and as a result, the third control flip-flop 196 is set by the logic high applied to its D input terminal 199. Its Q output terminal 208 is therefore driven to a logic low voltage and the second recycle NAND gate 213 and recycle NOR gate 216 are thus disabled during the second cycle through the decoding program. The memory reset instruction (XIO 77) is therefore ignored after the decoding program has been executed for a second time, and the controller program which follows is read from the memory 43.

After the decoding program is executed twice, the interface control circuit 73 is reset and prepared for the next auxiliary command word. The R input terminal 191 on the interface flip-flop 189 connects through a second inverter gate 225 to reset terminals 226 and 227 on the respective control flip-flops 195 and 196. Q output terminal 205 on the third control flip-flop 196 connects to a both a first input terminal 228 on a reset NAND gate 229, and to a first input terminal 230 on a buffer reset NAND gate 231. A second input terminal 232 on the reset NAND gate 229 connects through a third inverter gate 233 to shift register output terminal $179_1$, and reset NAND gate output terminal 234 connects to a reset terminal 235 on the first control flip-flop 194. A second input terminal 236 on the buffer reset NAND gate 231 connects to the output terminal 220 on the reset AND gate 221, and its output terminal 237 connects to the buffer reset bus 86. As indicated above, at the beginning of the second cycle through the decoding program, a positive voltage step is applied to the C input terminal 202 of the third control flip-flop 196 and its Q output terminal 205 is driven to a logic high voltage. The reset NAND gate 229 and buffer reset NAND gate 231 are thus enabled during the second cycle. When the second read-only memory is enabled during the second cycle, therefore, the shift register output terminal $179_1$ drops to a logic low voltage and this is inverted by the third inverter gate 233 and applied to gate the reset NAND gate 229. A logic low voltage is thus applied to the reset terminal 235 on the first control flip-flop 194 and it is reset. At the end of the second cycle through the decoding program, the memory reset instruction (XIO 77) is read and a logic high voltage is generated at the reset AND gate output terminal 220 and applied to gate the buffer reset NAND gate 231. As a result, a logic low voltage is generated on the buffer reset bus 86 and the addressable multiplexer 49 is cleared to receive further auxiliary command words. The next instruction read from the memory 43 is the first instruction of the controller program and a logic high voltage is therefore generated to the R input terminal 191 on the interface flip-flop 189. This logic high voltage is inverted by the second inverter 225 and applied to the reset terminals 226 and 227 to reset the second and third control flip-flops 195 and 196. The decoder enable bus 110 is thus driven to a logic low voltage and the interface circuit elements are effectively disabled until another auxiliary command word is received from the numerical control system.

Figure 9:
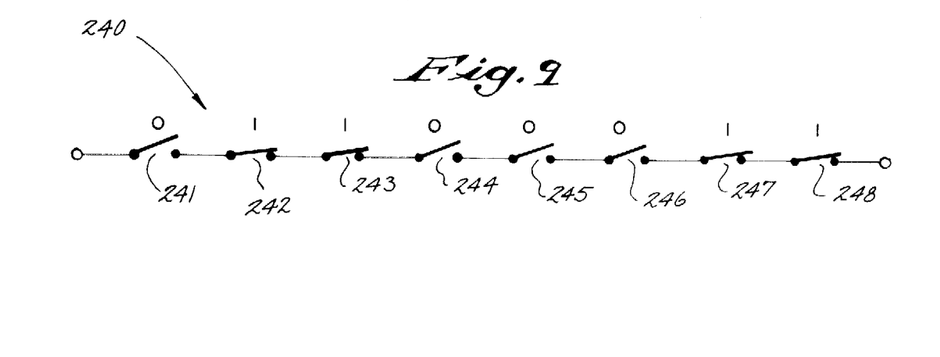
FIG. 9 is an illustration used to explain the invention.

The decoding program stored in the first five read-only memories operates to test the condition of each bit of the auxiliary command words stored in the addressable multiplexer 49. Each bit in a stored auxiliary command word is addressed with a read instruction (XIO or XIC), and its condition, is indicated by a logic signal on the logic input bus 67. The controller treats each auxiliary command word as a conductive branch containing a set of eight switches and the program tests the branch by reading the condition of each switch. Referring to FIG. 9 and using the program language and format developed in the above cited copending applications, an auxiliary command word (01100011) is equated to a branch 240 which contains a set of eight series connect switches 241–248. If, for example, this auxiliary command word is stored in the first buffer shift register 74 in the addressable multiplexer 49, the identity of the auxiliary command word is established by the following set of instructions:

| | OPERATION CODE | ADDRESS CODE |
|---|---|---|
| 0 | XIO | $10_8$ |
| 1 | XIC | $11_8$ |
| 1 | XIC | $12_8$ |
| 0 | XIO | $13_8$ |
| 0 | XIO | $14_8$ |
| 0 | XIO | $15_8$ |
| 1 | XIC | $16_8$ |
| 1 | XIC | $17_8$ |

When the above sub-routine is executed, each bit of the auxiliary command word is identified, and a STATE logic signal is generated by an instruction containing a SET operation code. The STATE logic signal is stored in a storage element designated by the address code which accompanies the SET operation code. For example, after the above eight instructions a SET $52_8$ instruction is programmed and the selected storage element in the addressable storage bank 48 receives and stores the STATE signal. Subsequently, when the controller program is executed, the condition of the same storage element is read with the expanded address $152_8$.

It should be apparent from the above descriptions that the interface circuit and addressable storage bank may be comprised of elements which are completely separable from the elements of the programmable controller. On the other hand, the interface circuit may include elements which are, or may be, part of the programmable controller, and the addressable storage bank may be a selected bank of controller output circuits. Also, the logic circuits and logic gates described herein are in some instances selected on the bases of their availability and cost, and it should be apparent to those skilled in the art that numerous alterations can be made to the circuits described herein without departing from the spirit of the present invention. Reference is, therefore, made to the following claims for interpreting the breadth of the invention.

I claim:

1. A programmable logic circuit for controlling auxiliary functions on a machine tool, the combination comprising:
   an interface circuit connected to a numerical control system to receive and decode auxiliary command words generated by the numerical control system and to selectively generate in response thereto STATE logic signals;
   an addressable storage bank containing a plurality of storage elements connected to receive and store STATE logic signals generated by the interface circuit; and
   a programmable controller connected to selectively address the storage elements in said addressable storage bank and programmed to read the condition of any such storage element and control the auxiliary functions on the machine tool.

2. The circuit as recited in claim 1 in which said interface circuit includes a programmable decoder connected to receive and identify the auxiliary command words.

3. The circuit as recited in claim 2 in which said programmable decoder includes a memory which is programmed to receive auxiliary command words at a set of input terminals and in response to each, generate a digital output signal which indicates the address of a selected storage element in said addressable storage bank.

4. The circuit as recited in claim 3 in which said programmable decoder includes a decoder circuit connected to receive the digital output signals generated by said memory, and in response to each, generate a STATE logic signal to the addressed storage element.

5. The circuit as recited in claim 1 in which said programmable controller includes a memory containing a decoding program and a controller program, and in which said interface circuit includes an addressable multiplexer connected to the programmable controller and connected to receive and store the auxiliary command words.

6. The circuit as recited in claim 5 in which the decoding program operates the programmable controller to examine each bit of an auxiliary command word stored in the addressable multiplexer and to thereby identify the auxiliary command word and generate a STATE logic signal to a preselected storage element in said addressable storage bank.

7. A programmable logic circuit for coupling a programmable controller with a digital control system that generates digital command words, the combination comprising:
   an addressable multiplexer connected to receive and store said digital command words, said addressable multiplexer being operable in response to instructions generated by said programmable controller to read out said stored digital command words to said conroller; and
   an addressable storage bank connected to said programmable controller, said addressable storage bank including a plurality of storage elements which are selectively addressable by said programmable controller and which are responsive when addressed to either store a STATE logic signal generated by said programmable controller or read a stored STATE logic signal to said programmable controller;
   wherein said programmable controller includes a decoding program which decodes a digital command word stored in said addressable multiplexer by reading the condition of each bit thereof, and having identified said digital command word, to generate a state logic signal to one of said addressable storage elements.

8. The circuit as recited in claim 7 wherein said decoding program is stored in a controller memory with a controller program, and in which an interface control circuit is connected to receive and store in a first control flip-flop a flag signal generated by said digital control system when a digital command word is generated to said addressable multiplexer, and in which said interface control circuit is responsive to said flag signal to generate an enable signal to the addressable multiplexer and the addressable storage bank.

9. The circuit as recited in claim 8 in which a memory control circuit is connected to said controller memory, and said memory control circuit is operable to address and read out in sequence each instruction in both the decoding and controller programs stored in said memory.

10. The circuit as recited in claim 9 which includes a memory reset bus connected to said memory control circuit and connected to a recycle gate in said interface control circuit.
   wherein a memory reset instruction is stored at the end of said decoding program and said recycle gate is responsive to the flag signal stored in said interface control circuit and to a digital signal which results when said memory reset instruction is read from the controller memory, to generate a digital signal on said memory reset bus which operates said memory circuit to reread the decoding program.

* * * * *

PO-1050
(5/69)

UNITED STATES PATENT OFFICE
CERTIFICATE OF CORRECTION

Patent No. 3,810,104          Dated May 7, 1974

Inventor(s) Theodore J. Markley

It is certified that error appears in the above-identified patent and that said Letters Patent are hereby corrected as shown below:

| | |
|---|---|
| Column 1, line 35 | "relay" should be -- rely -- |
| Column 5, line 7 | after "bit" -- binary -- should appear |
| Column 8, line 54 | "$91_{a-4}$" should read -- $91_{1-4}$ -- |
| Column 14, line 7 | "circit" should be -- circuit -- |
| Column 14, line 65 | "Q" should be -- $\bar{Q}$ -- |
| Column 17, line 37 | "conroller" should be -- controller -- |
| Column 18, line 39 | "memory circuit" should be -- memory control circuit -- |

Signed and sealed this 29th day of October 1974.

(SEAL)
Attest:

McCOY M. GIBSON JR.
Attesting Officer

C. MARSHALL DANN
Commissioner of Patents